United States Patent
Honma et al.

(10) Patent No.: US 11,623,596 B2
(45) Date of Patent: Apr. 11, 2023

(54) AIR BAG DEVICE AND METHOD FOR MANUFACTURING SAME

(71) Applicant: Autoliv Development AB, Vargarda (SE)

(72) Inventors: Keisuke Honma, Kanagawa (JP); Kazuki Morita, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/267,943

(22) PCT Filed: Jun. 19, 2019

(86) PCT No.: PCT/JP2019/024395
§ 371 (c)(1),
(2) Date: Feb. 11, 2021

(87) PCT Pub. No.: WO2020/035994
PCT Pub. Date: Feb. 20, 2020

(65) Prior Publication Data
US 2021/0316689 A1    Oct. 14, 2021

(30) Foreign Application Priority Data

Aug. 13, 2018 (JP) ............................ JP2018-152440
Sep. 21, 2018 (JP) ............................ JP2018-176776

(51) Int. Cl.
  *B60R 21/203* (2006.01)
  *B60R 21/2338* (2011.01)
  *B60R 21/237* (2006.01)

(52) U.S. Cl.
  CPC .......... *B60R 21/203* (2013.01); *B60R 21/237* (2013.01); *B60R 21/2338* (2013.01); *B60R 2021/23382* (2013.01)

(58) Field of Classification Search
  CPC .............. B60R 21/203; B60R 21/2338; B60R 21/2346; B60R 21/237; B60R 21/261; B60R 2021/23382
  See application file for complete search history.

(56) References Cited

U.S. PATENT DOCUMENTS 5,393,092 A * 2/1995 Chams ................ B60R 21/2338
                                                      280/743.1
5,456,651 A * 10/1995 Baker .................... B60R 21/237
                                                      493/405
5,690,358 A * 11/1997 Marotzke .............. B60R 21/237
                                                      280/743.1

(Continued)

FOREIGN PATENT DOCUMENTS

DE      102012010771 A1    12/2013
DE      102015220304 A1     5/2016

(Continued)

*Primary Examiner* — Laura Freedman
(74) *Attorney, Agent, or Firm* — Foley & Lardner LLP

(57) ABSTRACT

An airbag apparatus according to the first aspect of the present invention is configured such that the airbag is housed as a compressed body which is compressed to collapse. The second aspect of the present invention is a method for manufacturing an airbag apparatus, wherein the method includes the step of forming a compressed body of an airbag by compressing the airbag so as to collapse the airbag without rolling or folding the airbag.

21 Claims, 14 Drawing Sheets

(56) References Cited

U.S. PATENT DOCUMENTS

| | | | | |
|---|---|---|---|---|
| 5,782,737 A * | 7/1998 | Warner | B60R 21/237 | |
| | | | 493/405 | |
| 6,248,052 B1 * | 6/2001 | Kleeberger | B60R 21/237 | |
| | | | 53/244 | |
| 6,371,509 B1 * | 4/2002 | Ellerbrok | B60R 21/233 | |
| | | | 280/740 | |
| 6,382,662 B1 * | 5/2002 | Igawa | B60R 21/233 | |
| | | | 280/729 | |
| 6,406,061 B1 * | 6/2002 | Nishijima | B60R 21/237 | |
| | | | 280/743.1 | |
| 6,588,179 B2 * | 7/2003 | Haley | B60R 21/237 | |
| | | | 493/450 | |
| 6,598,903 B2 * | 7/2003 | Okada | B60R 21/2338 | |
| | | | 280/740 | |
| 6,610,000 B1 * | 8/2003 | Ishii | B60R 21/201 | |
| | | | 280/743.1 | |
| 6,612,609 B1 * | 9/2003 | Rodriguez | B60R 21/201 | |
| | | | 280/743.1 | |
| 6,619,015 B2 * | 9/2003 | Arwood | B65B 63/02 | |
| | | | 53/429 | |
| 6,994,664 B2 * | 2/2006 | Nishijima | B60R 21/237 | |
| | | | 493/449 | |
| 7,195,273 B2 * | 3/2007 | Lewis | B60R 21/2176 | |
| | | | 280/728.2 | |
| 7,481,449 B2 * | 1/2009 | Ishiguro | B60R 21/237 | |
| | | | 280/743.1 | |
| 7,891,705 B2 * | 2/2011 | Dennis | B60R 21/233 | |
| | | | 280/743.1 | |
| 8,899,618 B2 * | 12/2014 | Eckert | B60R 21/203 | |
| | | | 280/743.2 | |
| 9,126,563 B2 * | 9/2015 | Piccard | B60R 21/239 | |
| 10,654,440 B2 * | 5/2020 | Hotta | B60R 21/2338 | |
| 10,787,147 B2 * | 9/2020 | Fujimaki | B60R 21/2338 | |
| 11,186,250 B2 * | 11/2021 | Koshikawa | B60R 21/237 | |
| 11,235,731 B2 * | 2/2022 | Morita | B60R 21/26 | |
| 2016/0121840 A1 | 5/2016 | Iida | | |
| 2017/0136980 A1 | 5/2017 | Komatsu et al. | | |
| 2022/0089114 A1 * | 3/2022 | Morita | B60R 21/203 | |

FOREIGN PATENT DOCUMENTS

| | | |
|---|---|---|
| JP | 7-69151 A | 3/1995 |
| JP | 2003-276546 A | 10/2003 |
| JP | 2004-106841 A | 4/2004 |
| JP | 2016-88173 A | 5/2016 |
| JP | 2017-88073 A | 5/2017 |
| JP | 2018-20737 A | 2/2018 |

* cited by examiner

[FIG. 1]
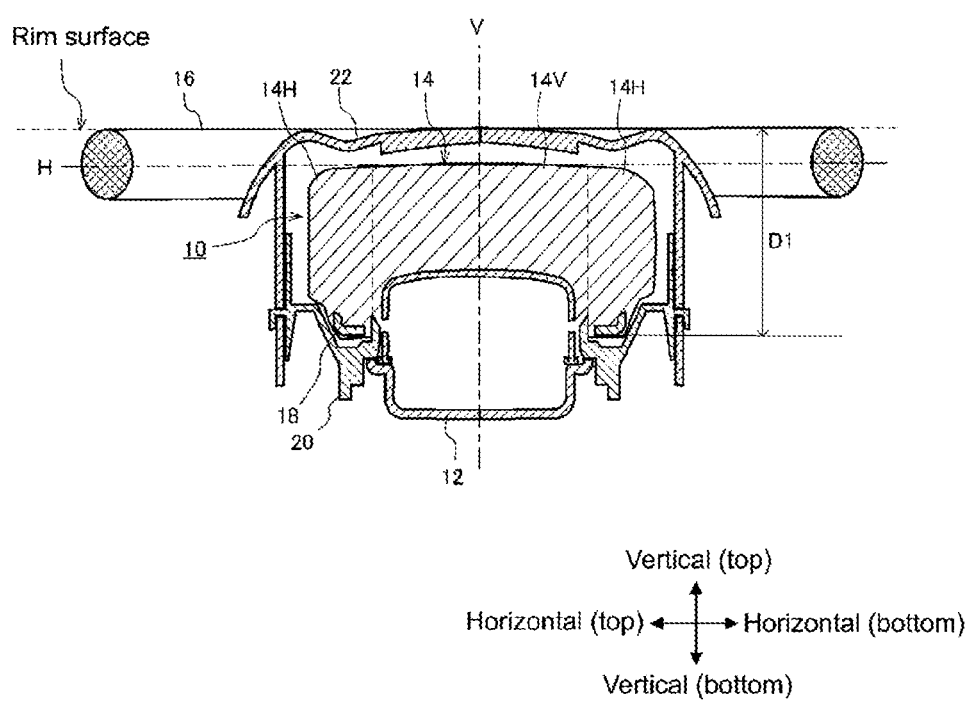

Vertical (top)

Horizontal (top) ←→ Horizontal (bottom)

Vertical (bottom)

Vertical (top)

Horizontal (top) ←→ Horizontal (bottom)

Vertical (bottom)

FIG. 5A1
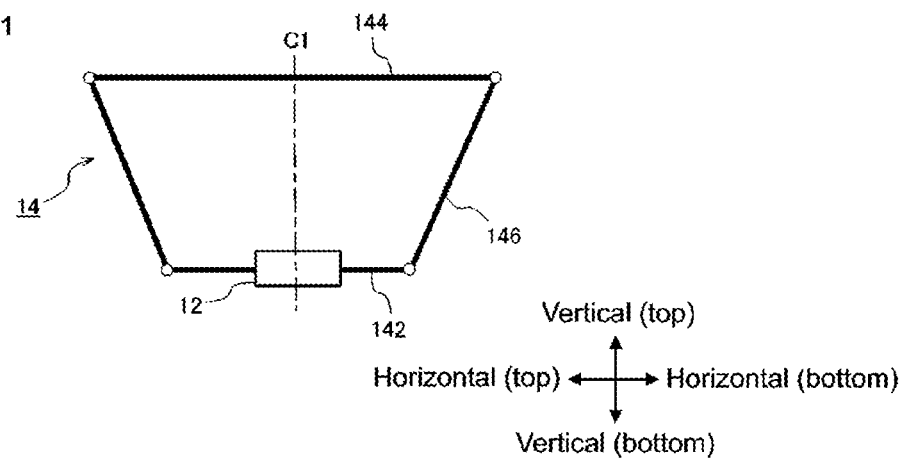
Vertical (top)
Horizontal (top) ↔ Horizontal (bottom)
Vertical (bottom)
FIG. 5A2
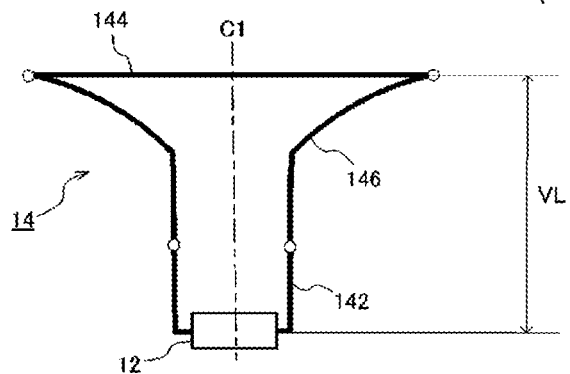
FIG. 5B
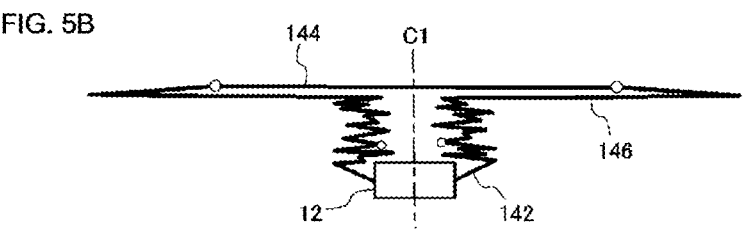

[FIG. 7]
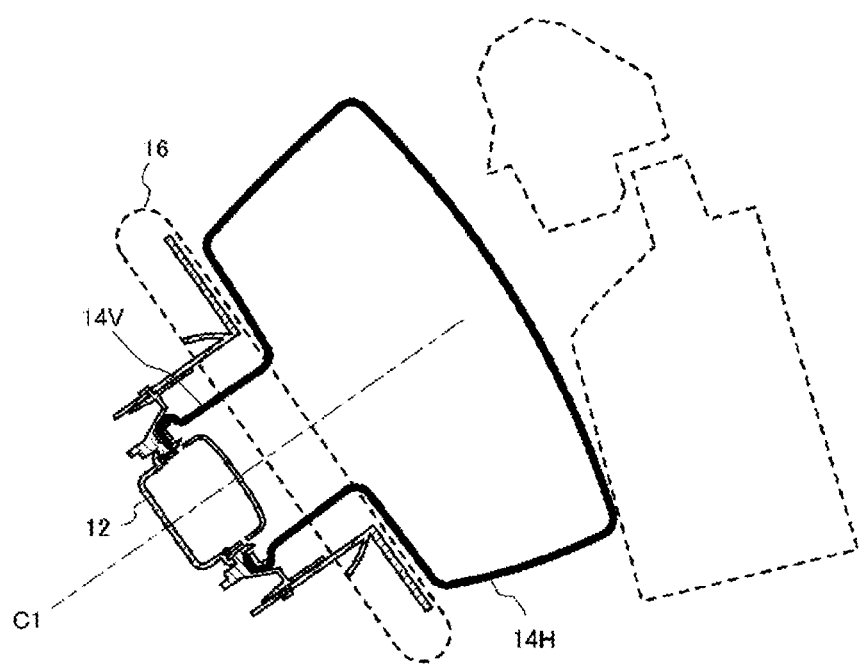
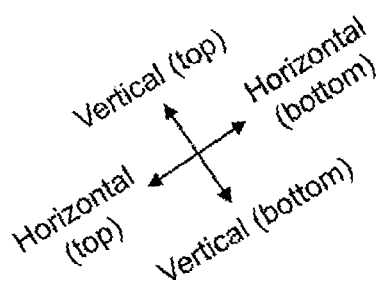

[FIG. 8]
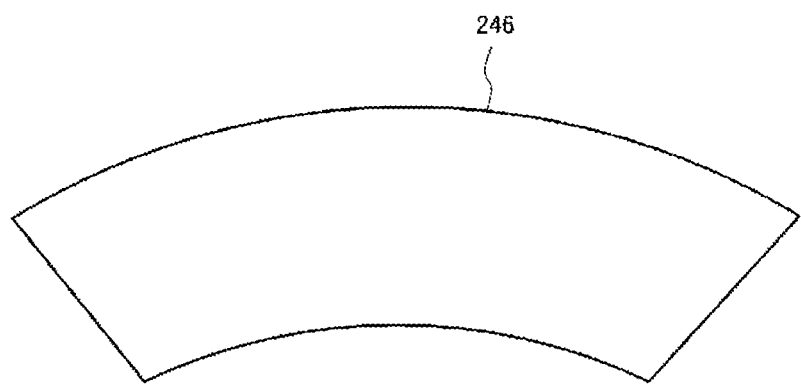

Vertical (top) ↕ Vertical (bottom)
Horizontal (top) ↔ Horizontal (bottom)

Vertical (top)
Horizontal (top) ←→ Horizontal (bottom)
Vertical (bottom)

[FIG. 14]
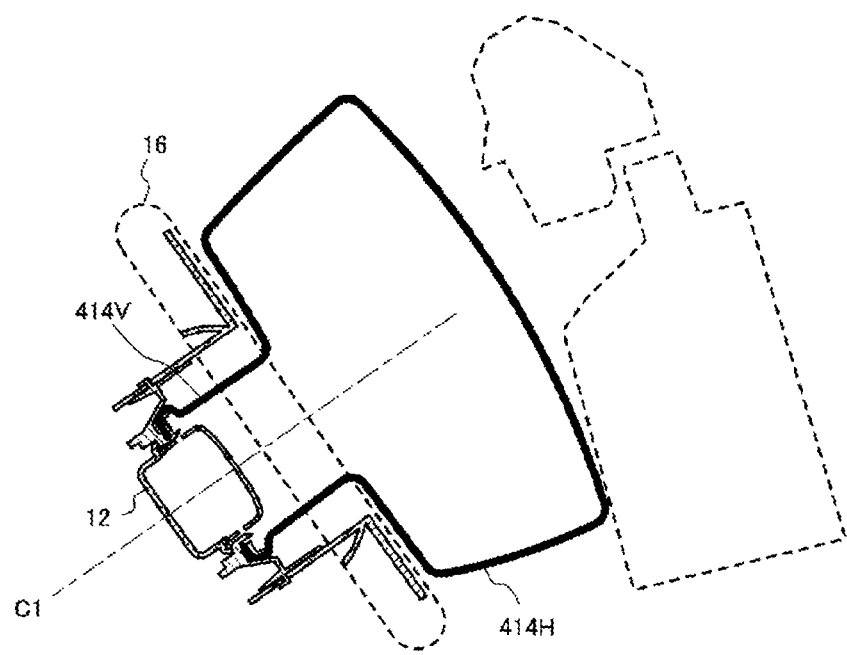
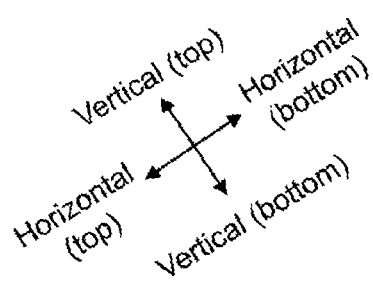

AIR BAG DEVICE AND METHOD FOR MANUFACTURING SAME

TECHNICAL FIELD

The present invention relates to a driver airbag apparatus housed in a steering wheel along with a method for manufacturing the same.

BACKGROUND

In order to protect passengers in the event of a vehicle collision, it is well known that vehicles are equipped with one or a plurality of airbags. These airbags include, for example, various forms such as: a so-called driver airbag which expands from near the center of the steering wheel of an automobile so as to protect the driver; a curtain airbag which deploys downward along the inner side of a window of the automobile so as to protect passengers during collisions in the transverse direction of the vehicle, as well as when overturning and during rollover accidents; and a side airbag which is deployed between the passenger and a side panel so as to protect the passenger upon impact in the transverse direction of the vehicle.

In this case, the driver airbag apparatus must be housed in a limited space within the steering wheel and is required to compress the airbag into a compact size. There is also a need to quickly and assuredly restrain the driver at the initial stage in which an airbag apparatus has been actuated.

SUMMARY OF THE INVENTION

Problem to be Solved by the Invention

The present invention has been created in view of the abovementioned problem, with an object of providing an airbag apparatus capable of quickly and assuredly restraining a passenger. In particular, an object of the present invention is to provide an airbag apparatus capable of quickly and assuredly restraining a passenger at the initial stage of deploying an airbag. Another object of the present invention is to provide an innovative method for manufacturing an airbag apparatus which helps to reduce manufacturing costs by simplifying the compression step of the airbag.

Means for Solving the Problem (First Aspect)

In order to solve the abovementioned problem, a first aspect of the present invention is an airbag apparatus which includes: an inflator which generates inflation gas; and an airbag deployed by the inflation gas to protect a passenger; wherein the airbag is housed as a compressed body which is compressed to collapse.

Herein, a "compressed body" means an airbag mass which is formed by crumpling the airbag in order to form the airbag into a desired compressed shape without being regularly folded or rolled. That is, this means that a compression step having regularity such as folding and rolling may be included; however, the main part of the formed compressed body must minimally include a mass which is irregularly collapsed and formed.

In this manner, the configuration is such that the airbag is housed in the form of a compressed body which is simply compressed, with no need for a complicated operation including folding the airbag many times along a predetermined fold line and rolling the airbag so that the center does not shift, making it possible to significantly simplify the manufacturing process.

Moreover, because the airbag is housed in the form of a compressed body, the airbag is quickly and smoothly deployed when the airbag apparatus is actuated. Meanwhile, when the airbag is folded and rolled into a bellows shape, as in an existing method, the airbag may become hooked at any location, preventing it from being smoothly deployed when the airbag is expanded and deployed.

The compressed body can include: a vertical compressed part which collapses in the direction vertical to the surface that is horizontal to the rim of the steering wheel on the inflator side of the airbag; and a horizontal compressed part which collapses along the surface that is horizontal to the rim at least on the distal side in the deployment direction of the vertical compressed part of the airbag.

Note that in the following description of the compression step and the deployment operation of the airbag, "horizontal" basically refers to the direction parallel to (along) the surface of the rim, while "vertical" basically refers to the direction vertical to the surface. In addition, on the plane parallel to the surface of the rim (in the horizontal direction), the abdomen of the passenger or the downward direction of the vehicle is the "bottom" side, while the direction facing the head side of the passenger or the top side of the vehicle is the "top" side. That is, viewing the steering wheel as a clock face, the 12 o'clock direction is regarded as the "top," while the 6 o'clock direction is regarded as the "bottom." Moreover, the passenger side is the "top" side and the steering column side is the "bottom" side in the direction vertical to the surface of the rim (in the vertical direction).

By forming a vertical compressed part which vertically collapses from the inflator side, the inflation gas released from the inflator first causes the vertical compressed part to be deployed towards the passenger side, such that the front surface of the airbag can approach or contact the passenger at the very initial stage, making it possible to quickly restrain the passenger from moving forward (in the steering wheel direction).

Moreover, in addition to the benefits of quickly restraining the forward movement of the passenger due to the presence of the vertical compressed part, the horizontal compressed body is quickly and smoothly deployed. That is, because the vertical compressed part is initially deployed, when the horizontal compressed part attempts to be horizontally deployed along the surface of the rim of the steering wheel, the horizontal compressed part has already been sufficiently pushed forward. As a result, the horizontal compressed part is smoothly deployed in the horizontal direction without any interference inside the steering wheel.

The end surface of the vertical compressed part opposite the inflator preferably reaches the outside of the rim at the initial stage of deploying the airbag. This means that the deployment (stretching) stroke of the vertical compressed part in the vertical direction is sufficiently increased. As described above, when the airbag starts to be deployed, the vertical compressed body is first deployed towards the passenger side, at which point, when the front surface of the vertical compressed part reaches the outside of the rim and the horizontal compressed part attempts to be horizontally deployed along the surface of the rim of the steering wheel, there is no object interfering in the horizontal direction, making it possible to more assuredly and smoothly deploy the airbag (horizontal compressed part) in the horizontal direction.

The airbag can be formed into a generally circular truncated cone shape by: a generally circular back panel coupled to the inflator; a generally circular front panel which faces the passenger upon deploying the airbag and has a larger diameter than the back panel; and a side panel which is coupled to the back panel and the front panel.

Alternatively, the airbag can be formed by a generally circular back panel coupled to the inflator as well as by a generally circular front panel which faces the passenger upon deploying the airbag.

A portion of the front panel facing the passenger side preferably remains exposed to the outside upon housing the airbag. That is, the entire upper surface (passenger side) of the front panel is preferably at least partially out of the surface without entering the interior in the compression step.

Such a configuration allows the passenger to be supported on the "flat surface" by the exposed front panel when the vertical compressed part is deployed at the initial stage of deploying the airbag, thereby improving the passenger restraining performance.

Moreover, the exposed part of the front panel preferably includes at least the front panel central region. Further, the vertical compressed part is preferably formed so as to include the central part of the front panel and the back panel.

By aligning the center of the back panel with the center of the front panel in the vertical direction, the vertical compressed part is easily linearly deployed in the vertical direction, making it possible to improve the deployment speed and stabilize the deployment behavior. That is, for example, situations in which the vertical compressed body meanders before being deployed can also be avoided.

Alternatively, the central axis in the vertical direction of the vertical compressed part can pass through the central part of the back panel, with the central part of the front panel capable of being formed so as to be shifted from the central axis. At this time, the central part of the front panel is preferably provided so as to be shifted in a more downward direction of the vehicle than the central axis of the vertical compressed part.

Such a configuration allows the airbag to deploy and enter more largely and quickly in the abdominal direction of the passenger than in the head direction thereof at the stage when the horizontal compressed part of the airbag starts to deploy.

A tether controlling the deployed shape of the airbag can be provided inside the airbag. In this case, the tether can include: a generally circular base part fixed to the central part of the front panel, and at least two string parts extending from the base part to the back panel. Herein the end part of the string part can be coupled to the vicinity of the periphery of the inflator. The presence of the tether further stabilizes the deployment behavior of the airbag.

The airbag apparatus can further include a rectifying fabric (which changes the direction of flow of gas ejected from the inflator) within the airbag, wherein a portion of the rectifying fabric can be configured so as to be disposed in the vicinity of the central part of the front panel. This rectifying fabric includes: a top plate fabric which is disposed in the vicinity of or in contact with the front panel when the airbag is compressed and housed, and a side surface part which extends from the top plate fabric to the back panel. An opening is provided on this side surface part so as to allow flow in the horizontal direction while the inflation gas ejected from the inflator is repelled by the top plate fabric. In addition, the length in the vertical direction of the side surface part is set to a length such that the vertical compressed part protrudes slightly from the horizontal surface of the passenger side end part of the rim of the steering wheel (the plane including the surface of the rim on the passenger side; hereinafter, referred to as the "rim surface") at the initial stage of the deployment. Moreover, when a portion of the rectifying fabric is disposed near the center of the front panel, the rectifying fabric extends in the vertical direction along with the vertical compressed part at the initial stage of deploying the airbag, protruding slightly from the rim surface of the steering wheel. In this manner, the presence of the rectifying fabric during the initial deployment of the airbag causes most of the pressure of the inflation gas to be directed vertically upward and acts to push the vicinity of the center of the inner surface of the front panel vertically upward, thereby promoting the upward vertical deployment of the airbag during the initial deployment of the airbag. In addition, when the initial deployment in the vertical direction proceeds, the inflation gas flows from an opening (provided on the side surface of the rectifying fabric) towards the horizontal direction in the airbag. This increases the force with which the airbag is horizontally deployed. The airbag is deployed from the part (which has already been deployed in the vertical direction to protrude slightly from the rim surface) so as to spread along the rim surface in the horizontal direction.

(Second Aspect)

The second aspect of the present invention is a method for manufacturing an airbag apparatus which includes: an inflator which is housed within a steering wheel and generates inflation gas, and an airbag which protects a passenger when the airbag is deployed by the inflation gas. This method includes a step of forming a compressed body of the airbag by compressing the airbag so as to collapse the airbag without rolling or folding the airbag.

The step of forming the compressed body can include: collapsing a part of the airbag on the inflator side in the direction vertical to the surface that is horizontal to the rim of the steering wheel to form a vertical compressed part, and collapsing the airbag along the surface that is horizontal to the rim at least on the distal side in the deployment direction of the vertical compressed part of the airbag to form a horizontal compressed part.

In the step of forming the vertical compressed part, the compression range of the vertical compressed part is preferably set such that the end part of the vertical compressed part opposite the inflator reaches the outside of the rim upon deploying the airbag.

The airbag can be formed into a generally circular truncated cone shape by: a generally circular back panel coupled to the inflator, a generally circular front panel which faces the passenger upon deploying the airbag and has a larger diameter than the back panel, and a side panel which is coupled to the back panel and the front panel. In addition, the vertical compressed part can be formed by a portion of the back panel and the side panel, with the horizontal compressed part capable of being formed by the remaining part of the side panel along with the front panel.

Alternatively, the airbag can be formed by a generally circular back panel coupled to the inflator as well as by a generally circular front panel which faces the passenger upon deploying the airbag. In addition, the vertical compressed part can be formed by the back panel, with the horizontal compressed part capable of being formed by the remaining part of the back panel along with the front panel.

In the step of forming the horizontal compressed part, at least a portion of the surface of the front panel preferably remains exposed to the outside.

The vertical compressed part can be formed so as to include the central part of the front panel and the back panel.

Alternatively, the central axis in the vertical direction of the vertical compressed part can pass through the central part of the back panel, with the central part of the front panel capable of being formed so as to be shifted from the central axis. At this time, the central part of the front panel is preferably provided so as to be shifted in a more downward direction of the vehicle than the central axis of the vertical compressed part.

BRIEF DESCRIPTION OF THE DRAWINGS

FIG. 1 is a cross sectional view illustrating the structure of an airbag apparatus according to Example 1 of the present invention.

FIGS. 5(A1), (A2), and (B) are explanatory views (cross sections) illustrating the compression step of the airbag according to Example 1 of the present invention.

FIG. 7 is an explanatory view illustrating the state in which the airbag according to Example 1 of the present invention is deployed.

FIG. 8 is a plan view illustrating another variation of a side panel forming the airbag according to Example 1 of the present invention.

FIG. 14 is an explanatory view illustrating the state in which the airbag according to Example 4 of the present invention is deployed.

EMBODIMENT OF THE INVENTION

Figure 2A:
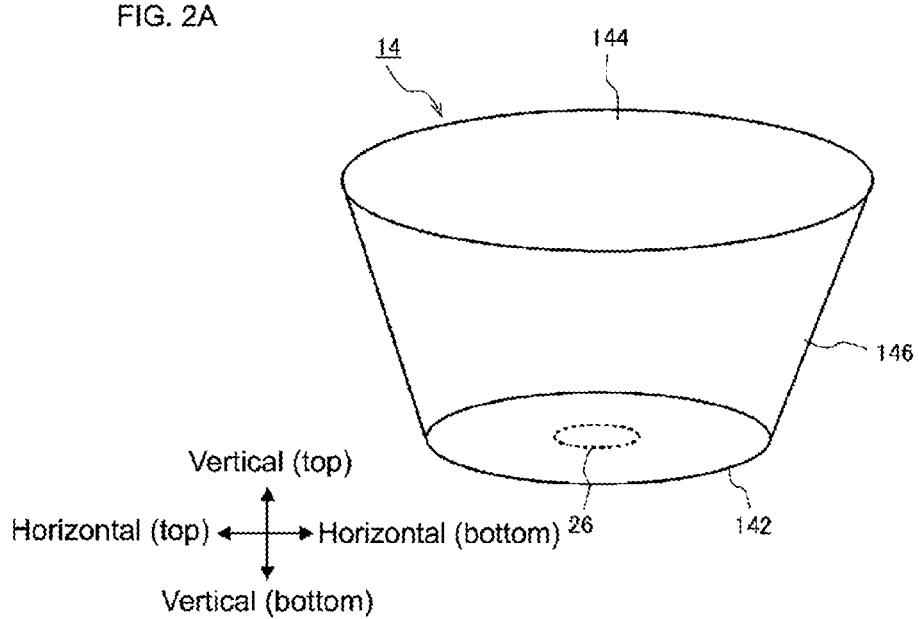
FIG. 2(A) is a schematic perspective view and FIG. 2(B) is a schematic cross sectional view, with both figures illustrating the panel structure of an airbag employed in the airbag apparatus according to Example 1 of the present invention.

Embodiments for carrying out the present invention will hereinafter be described with reference to the accompanying drawings.

FIG. 1 is a cross sectional view illustrating the structure of an airbag apparatus according to an example of the present invention. An airbag apparatus 10 according to the present example includes: a disk shaped (cylindrical) inflator 12 which generates inflation gas; and an airbag 14 which is deployed by the inflation gas to protect a passenger. The inflator 12 is fixed to a housing 20 via a retainer 18. The housing 20 is coupled to a cover 22 which covers the central part of the steering wheel in which the airbag apparatus 10 is housed.

As will hereinafter be described in detail, the airbag 14 is housed as a compressed body which is compressed to collapse. Herein, the "compressed body" means an airbag 14 mass which is formed by crumpling the airbag in order to form the airbag into a desired compressed shape without being regularly folded or rolled. That is, this means that a compression step having regularity such as folding and rolling may be included; however, the main part of the formed compressed body must minimally include a mass which is irregularly collapsed and formed.

The compressed body (14) according to the airbag includes: a vertical compressed part 14V which collapses in the direction vertical to the surface that is horizontal to a rim 16 of the steering wheel on the inflator 12 side of the airbag 14; and a horizontal compressed part 14H which collapses parallel to the surface that is horizontal to the rim 16 at least on the distal side in the deployment direction of the vertical compressed part 14V of the airbag 14.

Note that in the following description of the compression step and the deployment operation of the airbag, "horizontal" basically refers to the direction H parallel to the surface of the rim (rim surface), while "vertical" basically refers to the direction V vertical to the surface.

Example 1

Figure 2B:
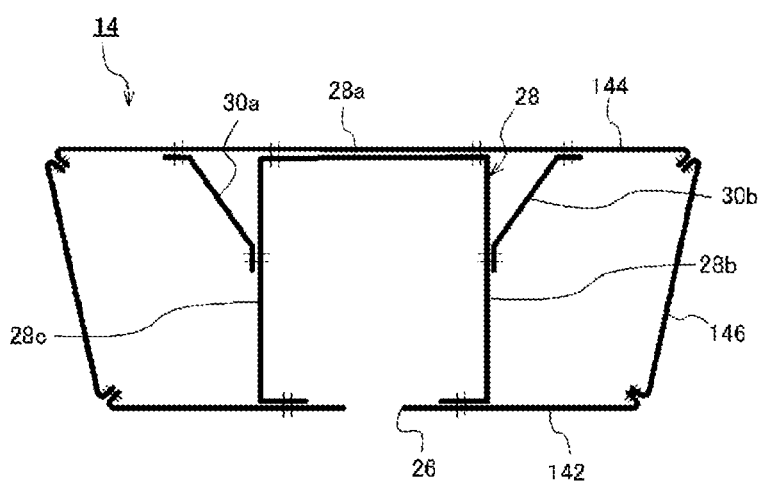

FIG. 2(A) is a schematic perspective view and FIG. 2(B) is a schematic cross sectional view, with both figures illustrating the panel structure of an airbag 14 employed in the airbag apparatus 10 according to Example 1. FIGS. 3(A) to 3(D) are plan views each illustrating the shape of each panel configuring the airbag 14 according to Example 1 of the present invention.

As illustrated in FIGS. 2(A) and 3, the airbag 14 is formed into a generally circular truncated cone shape by: a circular back panel 142 coupled to the inflator 12 via a retainer ring 18; a front panel 144 which is formed into a circular shape having a larger diameter than the back panel 142 and faces the passenger upon deploying the airbag 14; and a side panel 146 coupled to the back panel 142 and the front panel 144. Note that an opening 26 in which the inflator 12 is housed is formed at the center of the back panel 142.

Figure 3A:
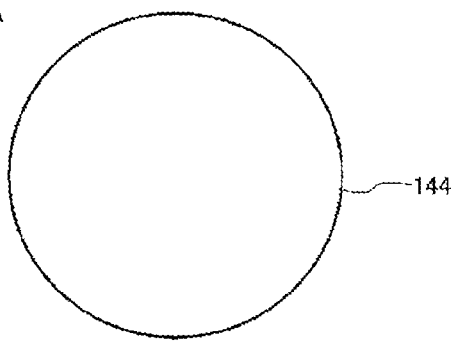
FIGS. 3(A) to 3(D) are plan views each illustrating the shape of each panel configuring the airbag according to Example 1 of the present invention.
Figure 3B:
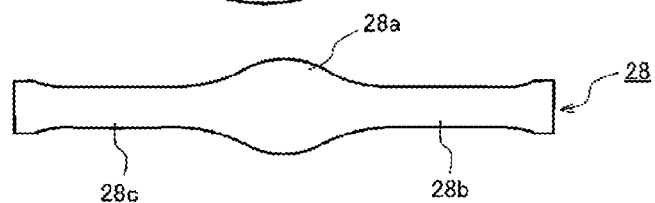
Figure 3C:
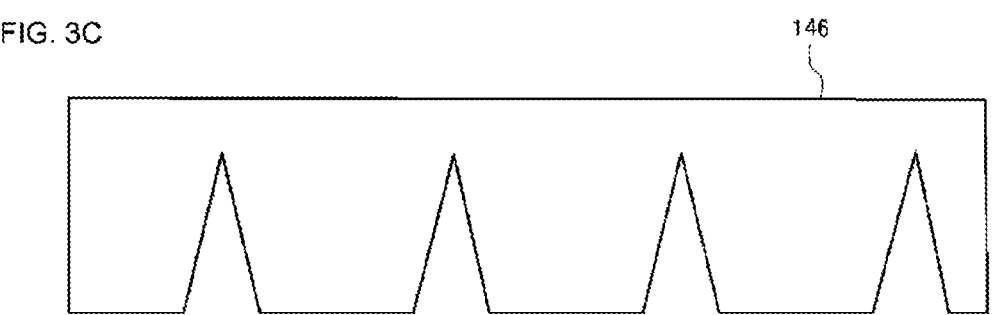
Figure 3D:
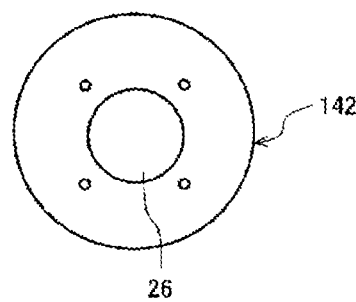

As illustrated in FIG. 3(C), the side panel 146 cuts into a rectangular (band shaped) member to smoothly form a truncated cone shaped side surface. Note that instead of the side panel 146, as illustrated in FIG. 8, a side panel 246 with a sector (an "annular sector" or "hollow sector," to be precise) can be employed.

As illustrated in FIG. 2(B), a tether 28 controlling the deployed shape of the airbag 14 is provided inside the airbag 14. Note that in FIG. 2(A), the structure of the interior of the airbag 14 including the tether 28 is omitted. Moreover, in FIG. 2(B), two parallel thin lines are illustrated as sewing locations.

The tether 28 includes: a generally circular base part 28a concentrically disposed and fixed to the central part of the front panel 144; and at least two string parts 28b, 28c extending from the base part 28a towards the back panel 142 side. The end parts of the string parts 28b, 28c are coupled to the vicinity of the periphery of the inflator 12. One end of the reinforcing fabrics 30a, 30b is coupled to the string parts 28b, 28c of the tether 28 by sewing, while the other end of the reinforcing fabrics 30a, 30b is coupled to the inner surface of the front panel 144 by sewing.

The presence of the tether 28 further stabilizes the deployment behavior of the airbag 14. That is, by adjusting the inflation range (thickness) in the vertical direction, the shape (thickness, surface area, etc.) of the airbag 14 can be adjusted upon the full deployment thereof.

FIGS. 4(A) to (D) are explanatory views illustrating the compression step of the airbag 14 according to Example 1 of the present invention, wherein (A) to (C) are cross sectional views, while (D) is a perspective view. FIGS. 5(A1), (A2), and (B) are explanatory views (cross sections) illustrating the compression step of the airbag 14 according to Example 1 of the present invention. Note that, in FIG. 5, for convenience of description, the sewing location of each panel 142, 144, and 146 is illustrated as a white circle. Moreover, although the structure around the inflator 12 is simplified, in practice, the inflator 12 is fixed to the back panel 142 via the retainer ring 18 (FIG. 1).

Figure 4A:
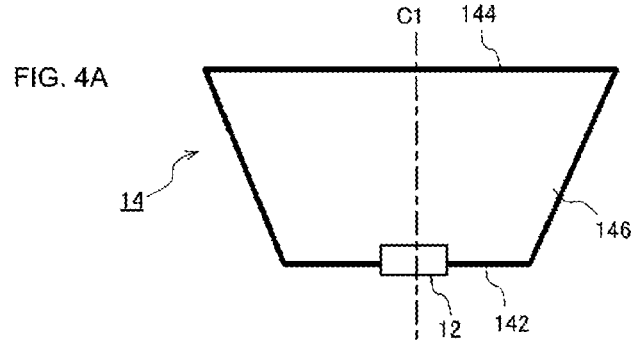
FIGS. 4(A) to (D) are explanatory views illustrating the compression step of the airbag according to Example 1 of the present invention, wherein (A) to (C) are cross sectional views, while (D) is a perspective view.

In the present example, upon compressing the airbag 14 from the state illustrated in FIGS. 4(A) and 5(A1), first, as illustrated in FIG. 5(A2), the central part of the back panel 142 is lowered, while a portion of the back panel 142 and the side panel 146 is cylindrically held. For example, prior to installing the inflator in the airbag, a tubular member can be inserted from the opening 26 of the back panel 142 and pushed towards the front panel 144 side, thereby enabling cylindrical forming.

Figure 4B:
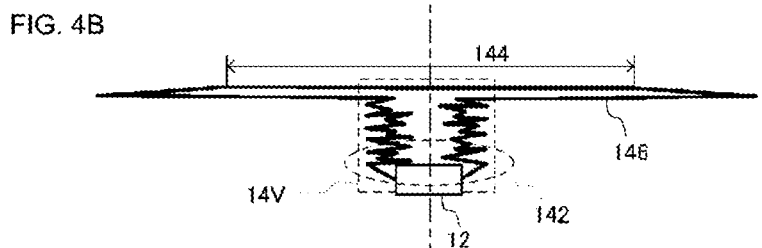

Next, as illustrated in FIGS. 4(B) and 5(B), the vertical compressed part 14V is formed by compressing the airbag 14 so as to collapse the airbag 14 in the vertical direction from the back panel 142 side towards the front panel 144 side. At this time, the vertical compressed part 14V is configured so as to include the central part of the front panel 144 and the central part of the back panel 142, with the cores aligned such that the center positions thereof overlap in the vertical direction. That is, the vertical direction V preferably matches the center line C1 of the airbag.

Moreover, in the step of forming the vertical compressed part 14V, as illustrated in FIG. 5(A2), the vertical height VL of the region being compressed to form the vertical compressed part 14V is greater than the distance (depth) D1 (see FIG. 1) from the bottom of the retainer ring 18 to the surface (rim surface) of the rim 16. This is because, at the initial deployment of the airbag 14, the upper surface of the vertical compressed part 14V assuredly reaches the outside of the cover 22, ensuring a stroke which protrudes towards the passenger side rather than towards the rim surface.

Figure 4C:
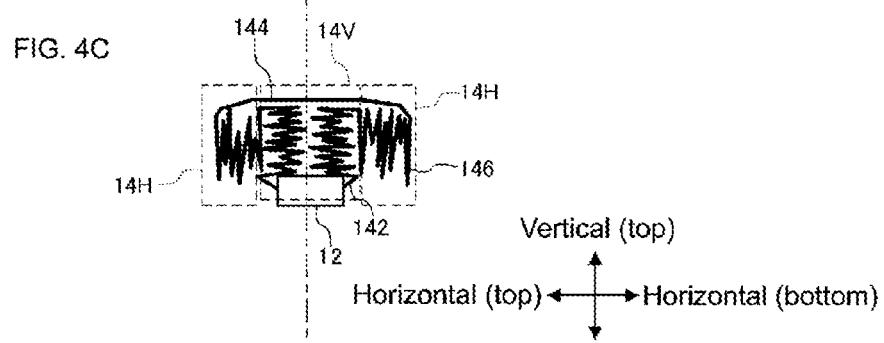
Figure 4D:
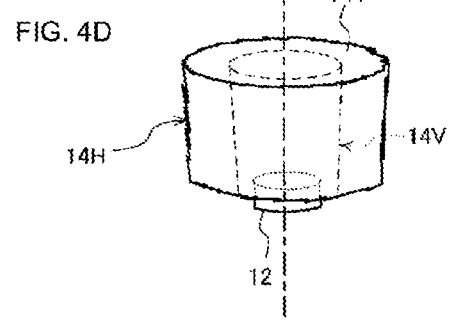

Next, as illustrated in FIGS. 4(C) and (D), the front panel 144 and the side panel 146 other than the vertical compressed part 14V are compressed so as to collapse in the horizontal direction, such that the horizontal compressed part 14H is formed around the vertical compressed part 14V. The vertical compressed part 14V and the horizontal compressed part 14H complete the compressed body (14). Note that in the horizontal compressed step, in reality, the vertical compressed part 14V also collapses in the horizontal direction to a certain degree.

Here, in the step of forming the horizontal compressed part 14H, at least a portion of the surface of the front panel 144 remains exposed to the outside. For example, the central part 28a of the tether 28 and the periphery thereof are preferably seen on the surface.

In the step of forming the horizontal compressed part 14H, for example, a push plate may be used to separately push and collapse in the X direction and the Y direction, alternately push and collapse, or simultaneously push and collapse.

As described above, in the present example, the airbag 14 employed is housed in the form of a compressed body which is simply compressed, with no need for any operation including repeatedly folding the airbag 14 along a predetermined fold line and rolling the airbag so that it is not shifted to the periphery of the core, making it possible to significantly simplify the manufacturing process.

Figure 6A:
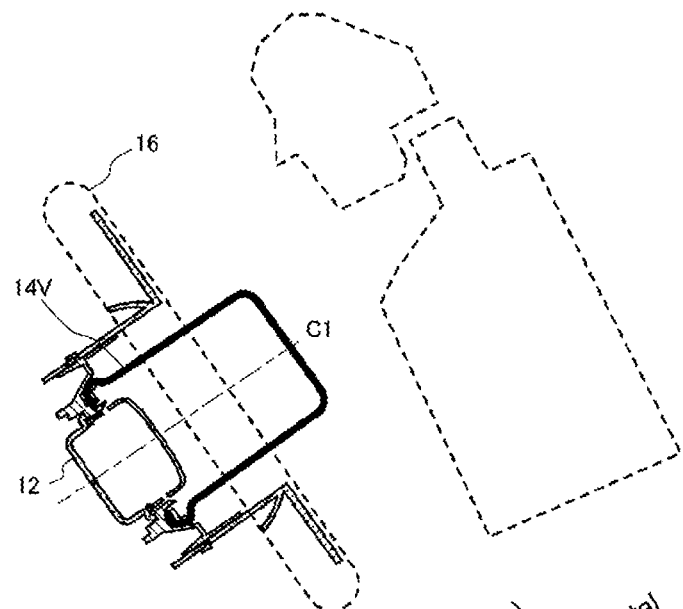
FIGS. 6(A) and (B) are explanatory views illustrating the state in which the airbag according to Example 1 of the present invention is deployed.

FIGS. 6(A), (B), and 7 are explanatory views illustrating the state in which the airbag 14 according to the present invention is deployed. Note that the deployment operation of the airbag described below is the same as those of Examples 2 and 3 described below in addition to that of Example 1 described above.

As the inflator 12 is activated and the inflation gas causes the airbag 14 to start being deployed, as illustrated in FIG. 6(A), at the initial stage of the deployment, the vertical compressed part 14V is initially deployed in the vertical direction and protrudes from the rim surface to push and break the cover 22 of the steering wheel so as to approach the passenger side. At this time, the horizontal compressed part 14H starts to be slightly but not significantly deployed.

In this manner, the inflation gas released from the inflator 12 first causes the tip part of the vertical compressed part 14V to be deployed towards the passenger side, such that the front surface of the airbag 14 protrudes from the rim surface at the very initial stage.

Further, in the present example, by aligning the center of the back panel 142 (on the small diameter side of the truncated cone) with the center of the front panel 144 (on the large diameter side) in the vertical direction, the vertical compressed part 14V is easily linearly deployed in the vertical direction, making it possible to improve the deployment speed and stabilize the deployment behavior. For example, this also allows situations to be avoided in which the vertical compressed body 14V meanders before being deployed.

Figure 6B:
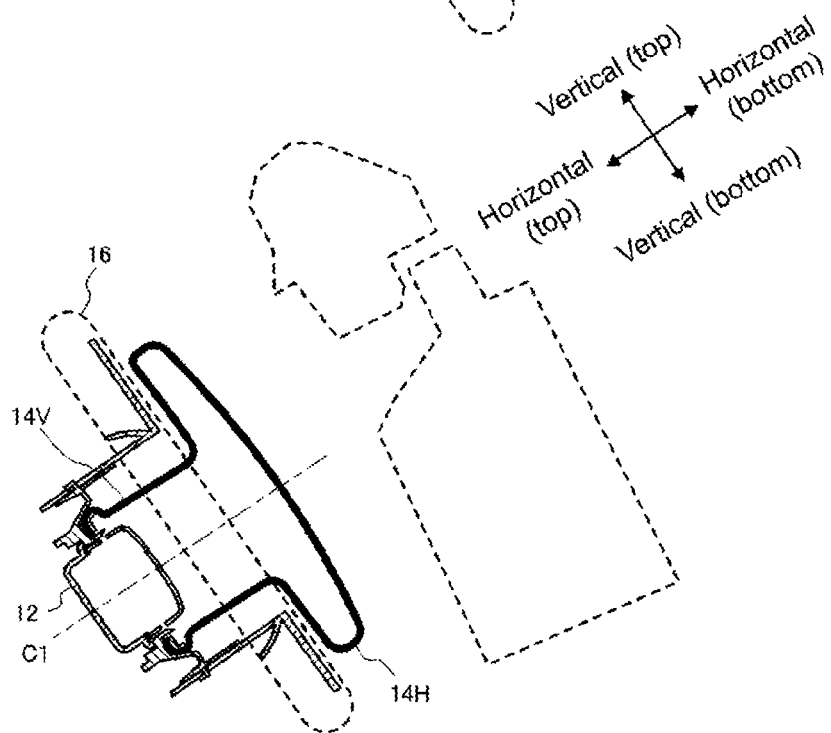

Next, as illustrated in FIG. 6(B), as the airbag 14 is deployed, the horizontal compressed part 14H is actively deployed, while the airbag 14 is deployed in the direction horizontal to the rim 16. That is, after the initial deployment of the vertical compressed part 14V, the horizontal compressed part 14H is deployed along the rim surface so as to cover the rim 16. Here, when the horizontal compressed part 14H attempts to be horizontally deployed along the surface of the rim 16 of the steering wheel, the horizontal compressed part 14H has already been pushed sufficiently forward due to the deployment of the vertical compressed part 14V, such that the horizontal compressed part 14H can be deployed without interference inside the steering wheel. This at least temporarily covers the rim 16 with the airbag 14 prior to the full deployment of the airbag 14. Consequently, even if the passenger potentially approaches the steering wheel direction prior to the full deployment of the airbag 14 during the collision (emergency) of the vehicle, the airbag 14 can avoid situations in which the abdomen of the passenger directly contacts (collides with) the steering wheel. Subsequently, as illustrated in FIG. 7, the full deployment of the airbag 14 can assuredly restrain the passenger.

Example 2

FIG. 9 is an explanatory view (cross section) illustrating the structure and compression step of an airbag 214 according to Example 2 of the present invention. FIG. 10 is a plan view illustrating the shape of a front panel 244(A) and a back panel 242(B) used in the airbag 214 illustrated in FIG. 9. Note that, in FIG. 9, as in FIG. 5, for convenience of description, the sewing location of each panel 242, 244 is illustrated as a white circle. Moreover, although the structure around the inflator 12 is simplified, in practice, the inflator 12 is fixed to the back panel 242 via the retainer ring 18 (FIG. 1). Moreover, components identical or corresponding to those of the abovementioned Example 1 are labeled with identical symbols, with redundant descriptions thereof omitted and with differences thereof mainly described.

In Example 1, the airbag 114 is configured by the back panel 142, the front panel 144, and the side panel 146. In contrast, in Example 2, the airbag 214 is configured by the back panel 242 and the front panel 244, with no side panels employed. In addition, as illustrated in FIG. 10, a bag having a bag shape is formed by coupling the outer edge parts of the back panel 242 and the front panel 244 having generally the same diameter by sewing.

Figure 9A:
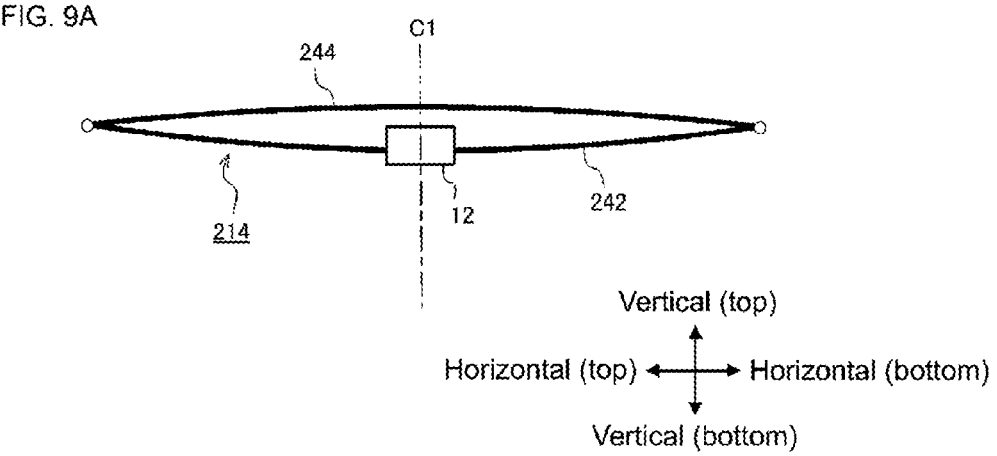
FIG. 9 is an explanatory view (cross section) illustrating the structure and compression step of an airbag according to Example 2 of the present invention.
Figure 10A:
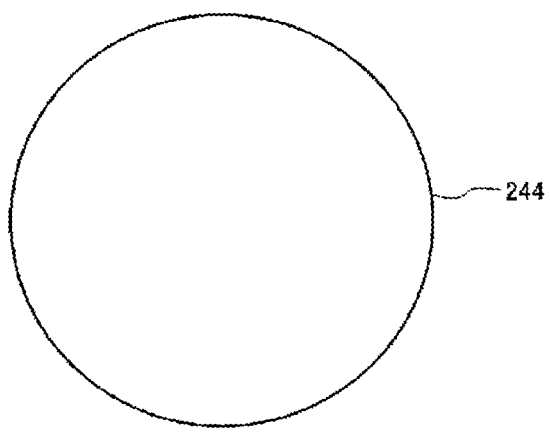
FIG. 10 is a plan view illustrating the shape of a front panel (A) and a back panel (B) used in the airbag illustrated in FIG. 9.
Figure 10B:
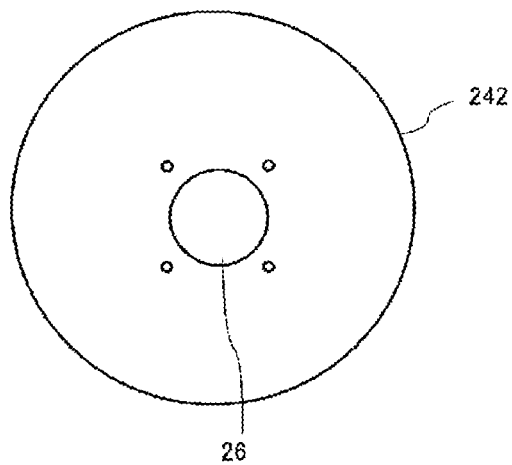

In the present example, upon compressing the airbag 214 from the state illustrated in FIG. 9(A), the central part of the back panel 242 is first lowered, while a portion of the back panel 242 is cylindrically held. In this example, while the airbag 214 is compressed with the inflator 12 set in the airbag 214, an axle, etc. may be passed through the opening 26 for an inflator so as to core the panels together prior to setting the inflator in order to center the panels together and cylindrically hold the portion of the back panel 242.

Figure 9B:
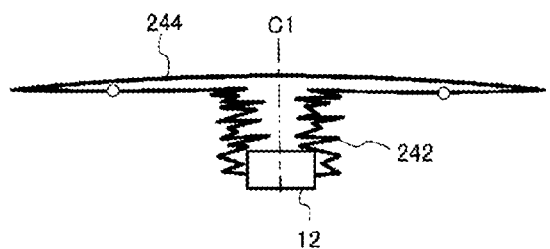

Next, as illustrated in FIG. 9(B), a vertical compressed part 214V is formed by compressing the airbag 214 so as to collapse the airbag 214 in the vertical direction from the back panel 242 side towards the front panel 244 side. At this time, as in Example 1, the vertical compressed part 214V is configured so as to include the central part of the front panel 244 and the central part of the back panel 242, with the cores aligned such that the center positions thereof overlap in the vertical direction.

Figure 9C:
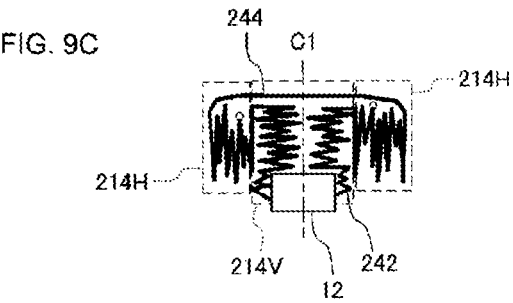

Subsequently, as illustrated in FIG. 9(C), the rest of the back panel 242 and the front panel 244 not forming the vertical compressed part 214V are compressed so as to collapse in the horizontal direction, such that a horizontal compressed part 214H is formed around the vertical compressed part 214V. The vertical compressed part 214V and the horizontal compressed part 214H complete the compressed body (214).

Example 3

FIG. 11 is an explanatory view (cross section) illustrating the structure and compression step of an airbag according to Example 3 of the present invention, corresponding to FIG. 4 of Example 1. Note that components identical or corresponding to those of the abovementioned Example 1 are labeled with identical symbols, with redundant descriptions thereof omitted and with differences thereof mainly described.

In Example 3, a rectifying fabric 300 which changes the direction of flow of gas ejected from the inflator 12 is provided within the airbag 14. For example, the rectifying fabric 300 includes: a top plate fabric 302 which is formed in a parachute shape (umbrella shape, arbor shape) so as to reflect gas (which is ejected from the inflator 12) on the inner surface of the ceiling part; and a side surface part 306 (which extends from the top plate fabric 302 towards the back panel 142 side). The side surface part 306 is provided with an opening 304 that allows the inflation gas ejected from the inflator 12 to be reflected on the inner surface of the top plate fabric 302, flow in the horizontal direction, and be guided in the side panel 146 direction (lateral direction).

Figure 11A:
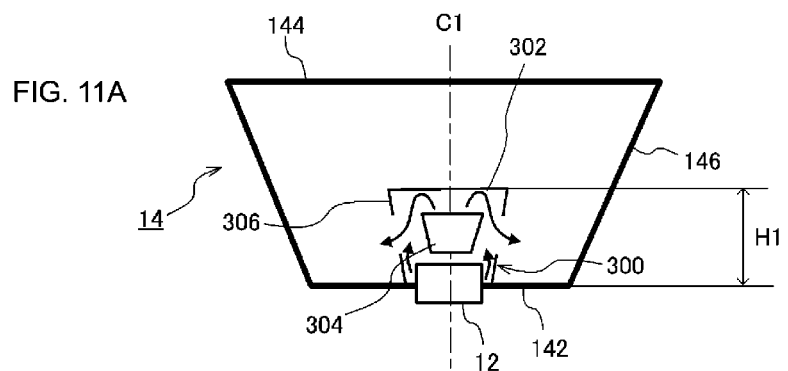
FIG. 11 is an explanatory view (cross section) illustrating the structure and compression step of an airbag according to Example 3 of the present invention.
Figure 11B:
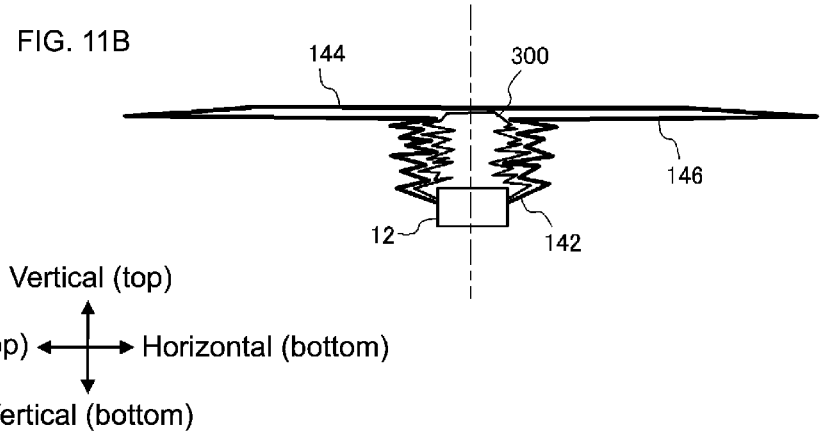
Figure 11C:
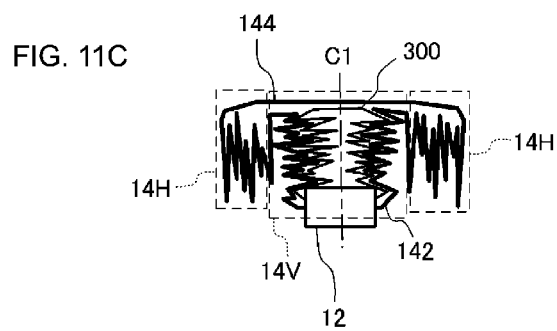

As illustrated in FIGS. 11(B) and 11(C), in the compressed state of the airbag 14, the top plate fabric 302 (front panel 144 side) of the rectifying fabric 300 is provided in the vicinity of the central part of the front panel 144. For example, as illustrated in FIG. 11(A), the maximum vertical height H1 of the rectifying fabric 300 is set to be equal to or greater than the length VL illustrated in FIG. 5(A2) or D1 illustrated in FIG. 1, while the vertical compressed part 14V is set to be a length so as to slightly protrude from the rim surface of the steering wheel during the initial deployment.

By setting the maximum height H1 of the rectifying fabric 300 in this manner, the rectifying fabric 300 extends in the vertical direction along with the vertical compressed part 14V at the initial stage of deploying the airbag 14, with the airbag 14 protruding slightly from the rim surface of the steering wheel. During the initial deployment, the presence of the rectifying fabric 300 causes most of the inflation gas ejected from the inflator 12 to be oriented vertically upward such that the top plate fabric 302 of the rectifying fabric 300 acts to push the front plate fabric 302 of the rectifying fabric 300 vertically upward in the vicinity of the center of the inner surface of the front panel 144, thereby promoting the upward vertical deployment of the airbag at the initial deployment of the airbag 14. In addition, in order to help expand and deploy the airbag 14 along the rim surface in the horizontal direction, gas can be subsequently primarily released in the horizontal direction from the opening 304 provided on the side part 306 of the rectifying fabric 300 such that the airbag 14 can cover the rim surface early. This at least temporarily covers the rim 16 with the airbag 14 prior to the full deployment of the airbag 14. Consequently, even if the passenger potentially approaches the steering wheel direction prior to the full deployment of the airbag 14 during a collision (emergency) of the vehicle, the airbag 14 can avoid situations in which the passenger contacts (collides with) the steering wheel. Subsequently, the airbag 14 can be fully deployed to assuredly restrain the passenger while further reducing damage to the passenger.

Example 4

Figure 12A:
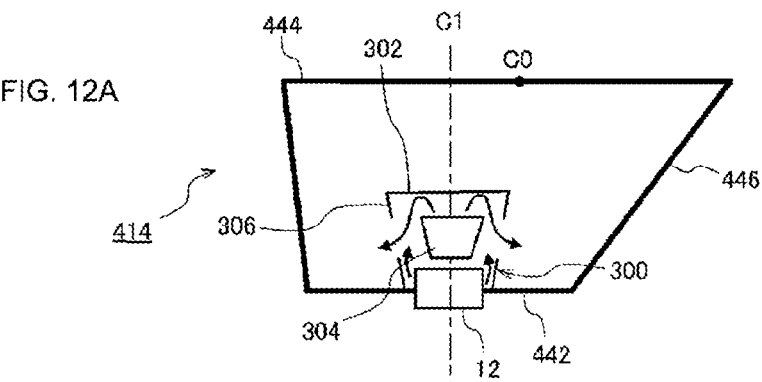
FIG. 12 is an explanatory view (cross section) illustrating the structure and compression step of an airbag according to Example 4 of the present invention.
Figure 12B:
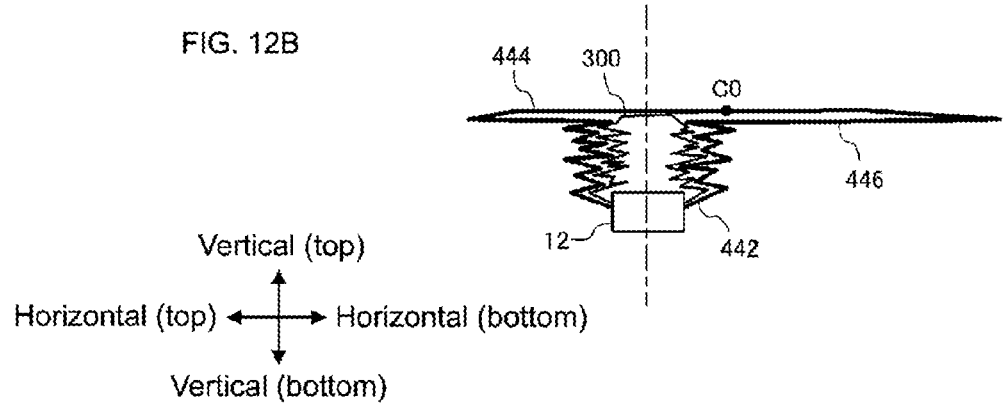
Figure 12C:
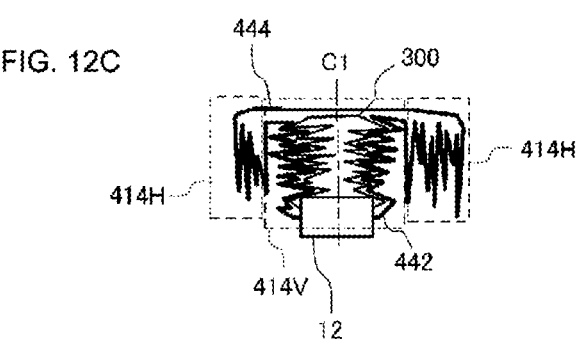

FIG. 12 is an explanatory view (cross section) illustrating the structure and compression step of an airbag according to Example 4 of the present invention, corresponding to FIG. 4 of Example 1 and FIG. 11 of Example 3. Note that in the present example, the structure of the airbag in Example 3 is arranged, while components identical or corresponding to those of the abovementioned examples are labeled with identical symbols, with redundant descriptions thereof omitted and with differences thereof mainly described.

The airbag 414 used in Example 4 includes a back panel 442, a front panel 444, and a side panel 446. In the present example, the central axis C1 in the vertical direction of a vertical compressed part 414H passes through the center of the back panel 442 and further through the center of the top plate fabric 302 of the rectifying fabric 300. However, the central axis C1 is formed such that it does not pass through the center C0 of the front panel 444, that is, the center C0 is formed so as to be shifted from the central axis C1. At this time, the central part C0 is formed so as to be shifted in the downward direction of the vehicle (the abdomen of the passenger, in the knee direction), that is, in the 6 o'clock direction when the steering wheel is viewed as a clock face.

Figure 13A:
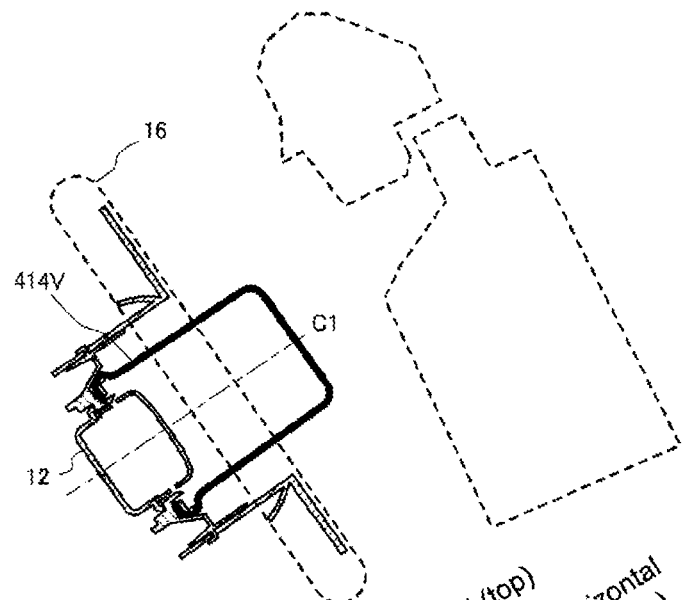
FIGS. 13(A) and (B) are explanatory views illustrating the state in which the airbag according to Example 4 of the present invention is deployed.

FIGS. 13(A), (B), and 14 are explanatory views illustrating the state in which the airbag according to Example 4 of the present invention is deployed. As the inflator 12 is activated and the inflation gas causes the airbag 14 to start being deployed, as illustrated in FIG. 13(A), at the initial stage of deployment, the vertical compressed part 414V is initially deployed in the vertical direction and protrudes from the rim surface to push and break the cover 22 of the steering wheel so as to approach the passenger. The operations described above are the same as those of Examples 1 to 3 described above.

Figure 13B:
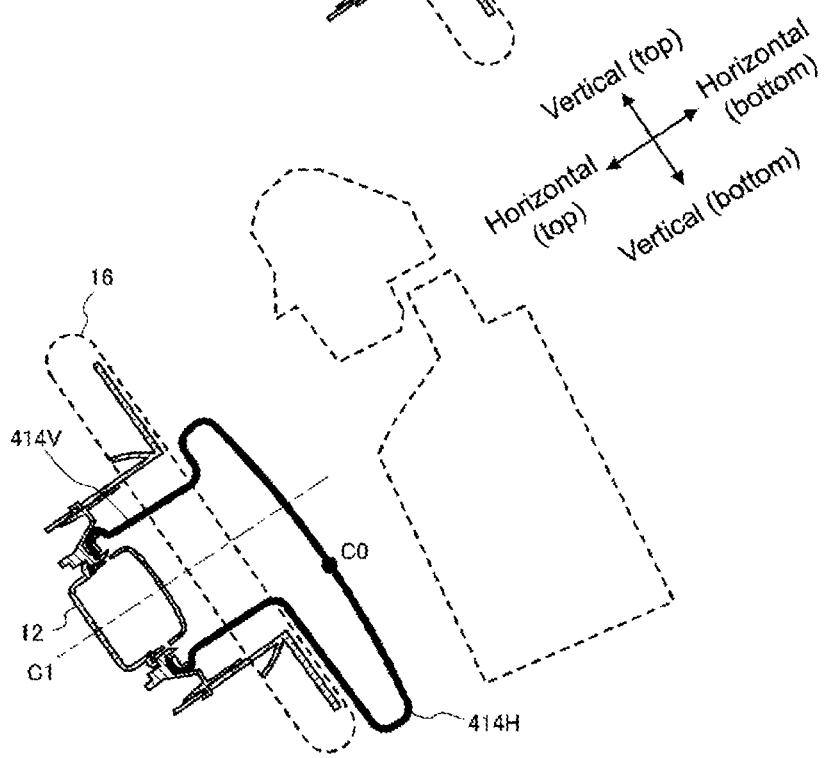

Next, as illustrated in FIG. 13(B), as the airbag 414 is deployed, the horizontal compressed part 414H is actively deployed, with the airbag 414 deployed in the direction horizontal to the rim 16. That is, after the initial deployment of the vertical compressed part 414V, the horizontal compressed part 414H is deployed along the rim surface so as to cover the rim 16. Here, when the horizontal compressed part 414H attempts to be horizontally deployed along the surface of the rim 16 of the steering wheel, the horizontal compressed part 414H has already been sufficiently pushed forward due to the deployment of the vertical compressed part 414V, such that the horizontal compressed part 414H can be deployed without interference inside the steering wheel. In this respect, it is also the same as those of Examples 1 to 3 described above.

In this example, the central part C0 of the front panel 442 is shifted in the abdominal direction (downward direction) of the passenger relative to the central axis C1 which vertically extends from the center of the inflator 12 through the back panel 446 of the airbag. Therefore, as illustrated in FIG. 13(B), such a configuration allows the airbag to deploy and enter more largely and quickly in the abdominal direction of the passenger than in the head direction thereof at the stage when the horizontal compressed part 414H of the airbag starts to deploy. As a result, even if the passenger potentially approaches the steering wheel direction prior to the full deployment of the airbag 414 during the collision (emergency) of the vehicle, the airbag 414 can avoid situations in which the abdomen of the passenger directly contacts (collides with) the steering wheel. Subsequently, as illustrated in FIG. 14, the full deployment of the airbag 414 can assuredly restrain the passenger.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications.

The invention claimed is:

1. An airbag apparatus housed within a steering wheel, comprising:
   an inflator which generates inflation gas; and
   an airbag configured to be deployed by the inflation gas to protect a passenger, the airbag comprising:
      a back panel coupled to the inflator;
      a front panel; and
      a side panel coupled to the back panel and the front panel, wherein the airbag is housed as a compressed body which is compressed to collapse, and wherein the compressed body comprises:
         a vertical compressed part which collapses in a direction vertical relative to a surface horizontal to a rim of the steering wheel, wherein the vertical compressed part comprises a first portion of the side panel; and
         a horizontal compressed part which collapses parallel to the surface horizontal to the rim of the steering wheel, wherein the horizontal compressed part comprises the front panel and a second portion of the side panel.

2. The airbag apparatus according to claim 1, wherein an end surface of the vertical compressed part opposite the inflator is configured so as to reach the outside of the rim at an initial stage of deploying the airbag.

3. The airbag apparatus according to claim 1, wherein the airbag is molded into a generally circular truncated cone shape by: the back panel coupled to the inflator, wherein the back panel is generally circular; the front panel configured to face the passenger upon deploying the airbag and having a larger diameter than the back panel, wherein the front panel is generally circular; and the side panel which is coupled to the back panel and the front panel.

4. The airbag apparatus according to claim 3, wherein a portion of the front panel facing a passenger side remains exposed to an outside upon housing the airbag.

5. The airbag apparatus according to claim 4, wherein the exposed portion of the front panel comprises at least a front panel central region.

6. The airbag apparatus according to claim 3, further comprising a rectifying fabric which changes a direction of flow of gas ejected from the inflator within the airbag,
   wherein a portion of the rectifying fabric is provided in a vicinity of a central part of the front panel.

7. The airbag apparatus according to claim 6, wherein the rectifying fabric comprises: a top plate fabric which is disposed in the vicinity of or in contact with the front panel when the airbag is compressed and housed; and a side surface part which extends from the top plate fabric to the back panel.

8. The airbag apparatus according to claim 7, wherein an opening is provided on the side surface part of the rectifying fabric so as to allow flow in a horizontal direction while the inflation gas ejected from the inflator is repelled by the top plate fabric.

9. The airbag apparatus according to claim 7, wherein a length in a vertical direction of the side surface part of the rectifying fabric is set to a length such that the vertical compressed part protrudes slightly from a horizontal surface of a passenger side end part of the rim of the steering wheel at an initial stage of the deployment.

10. The airbag apparatus according to claim 7, wherein the top plate fabric of the rectifying fabric is disposed near a center of the front panel when the airbag is compressed and housed.

11. The airbag apparatus according to claim 1, wherein the back panel is generally circular, and wherein the front panel is generally circular.

12. The airbag apparatus according to claim 1, wherein a central axis in a vertical direction of the vertical compressed part is formed so as to pass through a central part of the front panel and a central part of the back panel.

13. The airbag apparatus according to claim 1, wherein a tether controlling a deployed shape of the airbag is provided inside the airbag; wherein:
   the tether comprises: a generally circular base part fixed to a central part of the front panel, and at least two string parts extending from the base part to the back panel; and
   end parts of the at least two string parts are coupled to a vicinity of the periphery of the inflator.

14. The airbag apparatus according to claim 1, wherein a central axis in a vertical direction of the vertical compressed part is formed so as to pass through a central part of the back panel, and a central part of the front panel is formed so as to be shifted from the central axis.

15. The airbag apparatus according to claim 14, wherein the central part of the front panel is shifted in a more downward direction relative to a vehicle than the central axis of the vertical compressed part.

16. The airbag apparatus according to claim 14, wherein a tether controlling a deployed shape of the airbag is provided inside the airbag; wherein:

the tether comprises: a generally circular base part fixed to the central part of the front panel, and at least two string parts extending from the base part to the back panel; and end parts of the at least two string parts are coupled to a vicinity of the periphery of the inflator.

17. The airbag apparatus according to claim 14, further comprising a rectifying fabric which changes a direction of flow of gas ejected from the inflator within the airbag, wherein a portion of the rectifying fabric is disposed in the vicinity of the front panel which includes the central axis in the vertical direction of the vertical compressed part.

18. The airbag apparatus according to claim 17, wherein the rectifying fabric comprises: a top plate fabric which is disposed in the vicinity of or in contact with the front panel when the airbag is compressed and housed; and a side surface part which extends from the top plate fabric to the back panel.

19. The airbag apparatus according to claim 18, wherein an opening is provided on the side surface part of the rectifying fabric so as to allow flow in a horizontal direction while the inflation gas ejected from the inflator is repelled by the top plate fabric.

20. The airbag apparatus according to claim 18, wherein a length in the vertical direction of the side surface part of the rectifying fabric is set to a length such that the vertical compressed part protrudes slightly from a horizontal surface of a passenger side end part of the rim of the steering wheel at an initial stage of the deployment.

21. The airbag apparatus according to claim 18, wherein the top plate fabric of the rectifying fabric is disposed in the vicinity of the front panel, the front panel including the central axis in the vertical direction of the vertical compressed part when the airbag is compressed and housed.

* * * * *